United States Patent
Leigh et al.

(10) Patent No.: US 7,003,563 B2
(45) Date of Patent: Feb. 21, 2006

(54) REMOTE MANAGEMENT SYSTEM FOR MULTIPLE SERVERS

(75) Inventors: Kevin B. Leigh, Houston, TX (US); Doron Chosnek, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 755 days.

(21) Appl. No.: 10/003,649

(22) Filed: Nov. 2, 2001

(65) Prior Publication Data

US 2003/0088655 A1    May 8, 2003

(51) Int. Cl.
*G06F 15/16* (2006.01)
(52) U.S. Cl. ...................................... 709/223; 709/253
(58) Field of Classification Search ................ 709/223, 709/253; 710/110, 309, 316, 107, 305; 370/395.52; 713/501
See application file for complete search history.

(56) References Cited

U.S. PATENT DOCUMENTS

| | | | | |
|---|---|---|---|---|
| 5,502,838 A | * | 3/1996 | Kikinis | 713/501 |
| 5,579,486 A | * | 11/1996 | Oprescu et al. | 710/107 |
| 5,732,212 A | * | 3/1998 | Perholtz et al. | 709/224 |
| 5,815,674 A | * | 9/1998 | LaBerge | 710/107 |
| 5,941,951 A | * | 8/1999 | Day et al. | 709/233 |
| 6,070,253 A | * | 5/2000 | Tavallaei et al. | 714/31 |
| 6,119,159 A | * | 9/2000 | Tseng et al. | 709/224 |
| 6,408,334 B1 | * | 6/2002 | Bassman et al. | 709/223 |
| 6,704,812 B1 | * | 3/2004 | Bakke et al. | 710/38 |
| 2002/0046405 A1 | * | 4/2002 | Lahr | 725/87 |

* cited by examiner

*Primary Examiner*—Krisna Lim
*Assistant Examiner*—Philip Chea (57) ABSTRACT

A remote management system for a group of servers, typically a group mounted in a single rack. A daisy-chained bus is used to couple server management command, status and data, including keyboard, video, mouse and downloaded data signals between a server selected from the group and a single remote management unit. A local management unit is provided for each server to couple digital video and status data onto the daisy-chained bus in packet format and to convert packet format signals received from the bus to signals that can be used by the server. A multiplexor is provided to selectively couple the packetized video and status data from a server onto the bus and through the bus to the single remote management unit. The remote management unit converts video and status signals to web page format and couples to a remotely located server manager via IP protocol.

16 Claims, 9 Drawing Sheets

REMOTE MANAGEMENT SYSTEM FOR MULTIPLE SERVERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to remote management of computer servers and more particularly to a system which minimizes the hardware and software needed to remotely manage multiple servers.

2. Background of the Invention

It is becoming common for businesses to use large numbers of computer servers. For example, Internet service providers may need hundreds or even thousands of servers. Websites are operated by servers. The more successful the website, the more servers it requires. When hundreds or thousands of servers are to be located on one premises, they need to be adapted for rack mounting to save space and provide for convenient routing of power and signal cables.

Computer servers usually have the standard ports for a keyboard, a monitor and a mouse. However, servers are normally purchased and installed without such peripherals attached to each server, which would increase the equipment cost, and more importantly the space required to house the servers. It is possible to connect these peripheral devices to manage a server on a temporary as-needed basis, which involves bringing a set of peripherals (on a "crash cart") close enough to the server to be connected. This approach is very time consuming, especially when hundreds or thousands of servers are to be managed. Alternately, KVM (Keyboard, Video, Mouse) cables from each server can be connected to a KVM switch, and a set of KVM peripherals can be connected to the KVM switch to manage a number of servers. A typical KVM switch can handle about eight servers. Multiple KVM switches can be cascaded to manage more servers than a single KVM switch can support. KVM cables are bulky and can run only tens of meters. In Data Centers housing large numbers of servers, using KVM cables and switches will allow limited remote manageability, but the installation involves so many bulky KVM cables and switches that it may be impractical for cost, space, usability and scaling.

It is highly desirable to manage servers remotely, especially from across a building, town, country, or even the world. The hardware and software for true remote management is currently available. For example Compaq Computer Corporation produces a remote management system known as Remote Insight Lights-Out Edition (RILOE). The RILOE includes a remote management module, RMM, which is available as a PCI card or chip set, which may be installed in each server to be remotely managed. Each RMM is assigned a network address and coupled by a network cable to a network switch. The switch connects the remote management modules in the servers to a network, e.g., the Internet, so that a server administrator may use a remote computer system to connect to and manage any server which is connected to the switch. The remote computer system may connect to the servers through a local network, a wide area network or the Internet. In addition to the keyboard, video and mouse console functions, the remote management functions can also include the following:

- virtual devices, such as, virtual power button, virtual CD and virtual floppy
- transmitting recorded video sequences, such as, last failure and last POST (Power-On Self-Test)
- different log-in privileges to different remote boards
- sending alerts, such as, remote boards request that the manager board send an SNMP (Simple Network Messaging Protocol) trap over the network.

As discussed above, many businesses have hundreds or thousands of servers. Since almost all the racks to hold servers have mounting holes in 1U increments, server height dimension is typically a multiple of 1U. A "1 Rack Unit," or in short "1U," measures 1.75 inches. Modern low-profile servers have a vertical dimension of 1U. Therefore, a standard 42U server rack can hold a total of forty-two servers. If all the servers in a rack are to be remotely managed, forty-two remote management modules, forty-two network addresses, forty-two network cables and a switch having capacity for forty-two network lines are required for each rack. This equipment represents a significant investment. This problem is amplified multiple times as the number of servers grows in a rack. With the advent of blade servers, where server modules are vertically orientated, there can be hundreds of servers within a 42U rack.

It would be desirable to provide a remote management system for multiple servers that requires less equipment than the prior art systems.

BRIEF SUMMARY OF THE INVENTION

The problems noted above are solved in large part by a system including one or a small number of remote management units to provide remote management for a group of servers, where the group of servers is larger than the number of remote management units. A bus system selectively couples one server to one remote management unit at a time.

In one embodiment, the system includes a single remote management unit and a bus coupling the remote management unit to a group of servers. A local management controller is provided for each server, to convert server management status and video signals to packetized signals, as well as to convert packetized signals to server management commands and downloaded management data. The bus selectively couples the packetized server management signals from one selected server to the remote management unit.

In another embodiment, a multiplexor for each server in the group couples segments of the bus in series, and in response to a signal identifying a server, couples server management signals from the identified server to the remote management unit through the bus.

In another embodiment, two remote management units are coupled to the same group of servers through two signal busses and two sets of multiplexors. Any server in the group may be coupled to either of the two remote management units at any given time. Any two servers in the group may therefore be remotely managed at the same time. This embodiment is modular and can be extended to any number of remote management units, including a number that exceeds the number of servers being managed.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
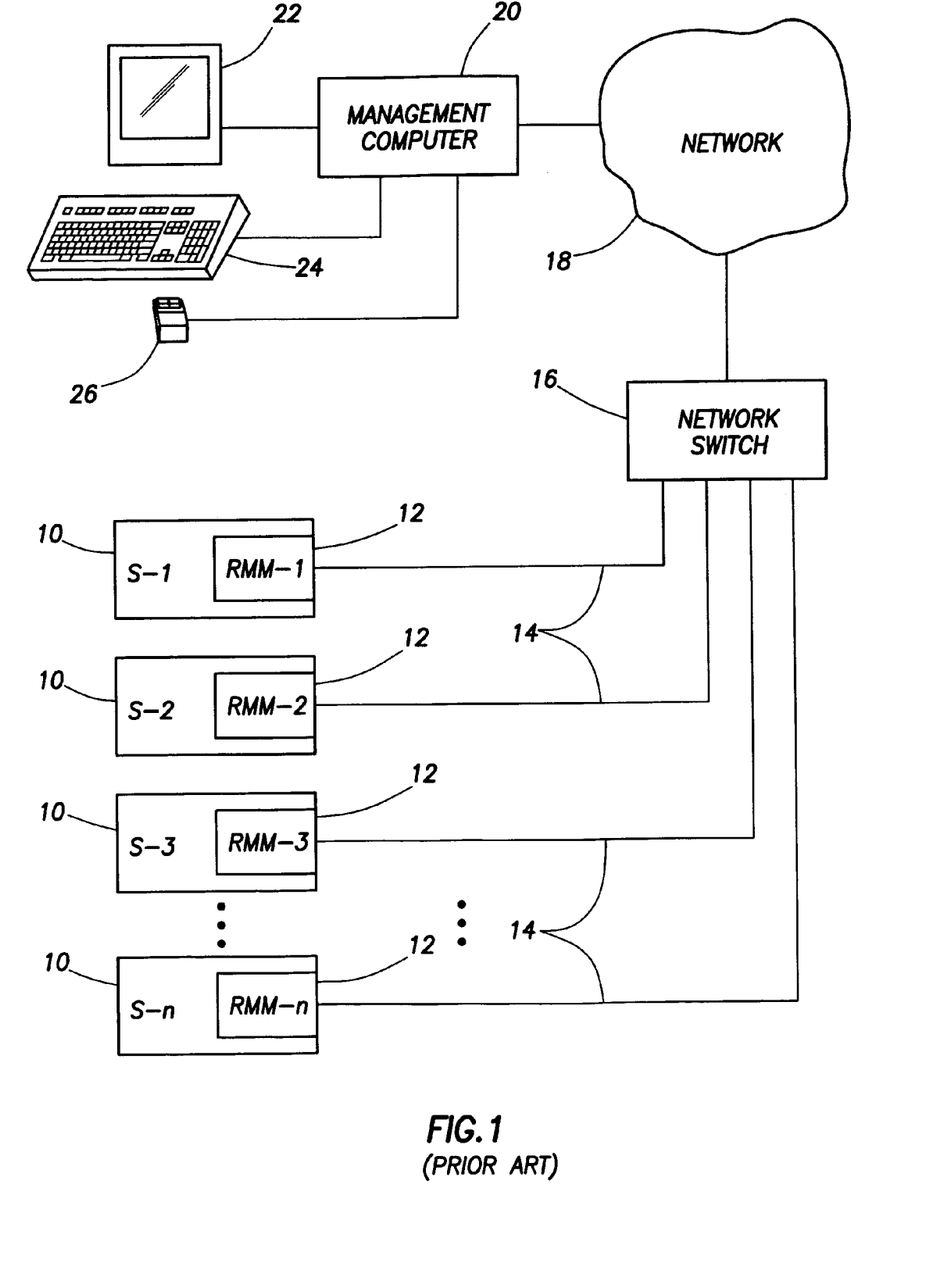
FIG. 1 is a block diagram of a prior art remote management system for multiple servers.

Referring now to FIG. 1, a prior art system for providing remote management of multiple servers is illustrated. Servers 10, also labeled S-1 through S-n, represent a number n of servers which may all be mounted in a single rack. A remote management module 12, also designated RMM-1 through RMM-n, is provided in each of the servers 10. A suitable RMM 12 is sold as a chip set or card as part of the Remote Insight Lights Out Edition system manufactured by Compaq Computer Corporation. Each RMM 12 is connected by a network cable 14 to a network switch or hub 16 to which it sends signals in IP protocol. The switch 16 is coupled through a network 18, e.g., the Internet, to a remotely located management computer 20. The computer 20 is connected to a monitor 22, keyboard 24 and mouse 26. For servers having a thickness of 1U, i.e., 1.75 inch, up to forty-two servers 10 can be mounted in one standard rack. The same number of remote management modules 12 and cables 14 are required. Each card 12 is also required to have a separate network address.

The purpose of the system of FIG. 1 is to allow a network administrator to use the computer 20 with monitor 22, keyboard 24 and mouse 26, to remotely manage the functions of the servers 10. While the administrator has access to all n of the servers 10 and can manage multiple servers, he or she typically manages one server at a time. Most management functions require only occasional access to each server. This is why a single administrator and a single remote computer 20 can effectively manage a large number of servers. However, this also means that a significant investment in remote management equipment is not efficiently used in the sense that each module 12, its associated cable 14 and the switch 16 are only used a relatively small percentage of the time. The network switch 16 is not an inexpensive piece of equipment which is needed only because of the multiple management modules 12.

Figure 2:
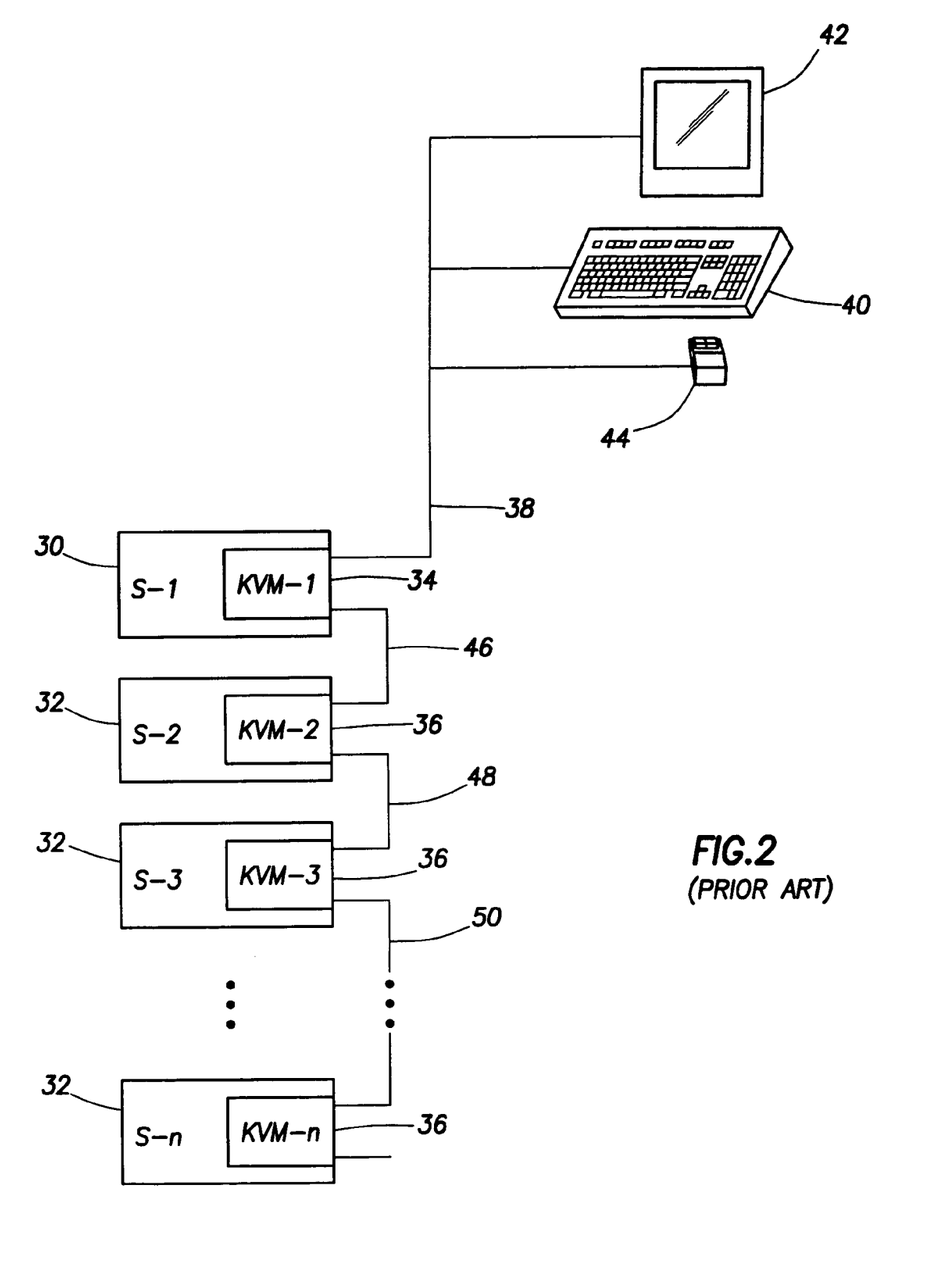
FIG. 2 is a block diagram of a prior art console management system for multiple servers.

With reference to FIG. 2, an embodiment of a prior art console management system for multiple servers will be described. Server 30, also labeled S-1, and servers 32, also labeled S-2 through S-n, represent a plurality n of servers which may be mounted in a single rack. Each server 30, 32 includes a KVM, (keyboard, video, mouse) interface card. Server 30 includes a master KVM card 34, also labeled KVM-1. Servers 32, each include a slave KVM card 36 also labeled KVM-2 through KVM-n. The KVM cards 34, 36 convert each server's keyboard, video and mouse signals into modulated analog signals which are carried over a single CAT5 UTP cable having four twisted pair wires. KVM cards 34, 36 also include multiplexing and addressing circuitry to allow the cards to be daisy chained as illustrated. KVM cards 34, 36 may be cards produced by Compaq Computer Corp., under the product name PCI KVM Switch or functional equivalents thereof such as KVM switches manufactured by Minicom Advanced Systems Ltd., Avocent Corp., APC, Rose Electronics, Raritan, Lightwave Communications, and Network Technologies Inc. Although some KVM switches that are functionally equivalent to KVM switch card 34 in FIG. 2 can also be connected to a network interface module so that a remote management computer 20 as shown in FIG. 1 can be used as a console, these products are designed merely to support the KVM functions. The master KVM card 34 has a first port 38 to connect to a set of console devices including keyboard 40, video monitor 42, and mouse 44, and a second port to connect to the slave KVM cards 36 via a CAT5 cable 46. Each slave KVM card 36 has two ports to facilitate the daisy chain connection in which: KVM-2 is coupled to KVM-3 by CAT5 UTP cable 48; and KVM-3 is coupled to KVM-n by CAT5 UTP cable 50. It will be apparent that the cables 46, 48, 50 are relatively short in a rack mounted server system where servers 30 are physically positioned one on top of another.

Figure 3:
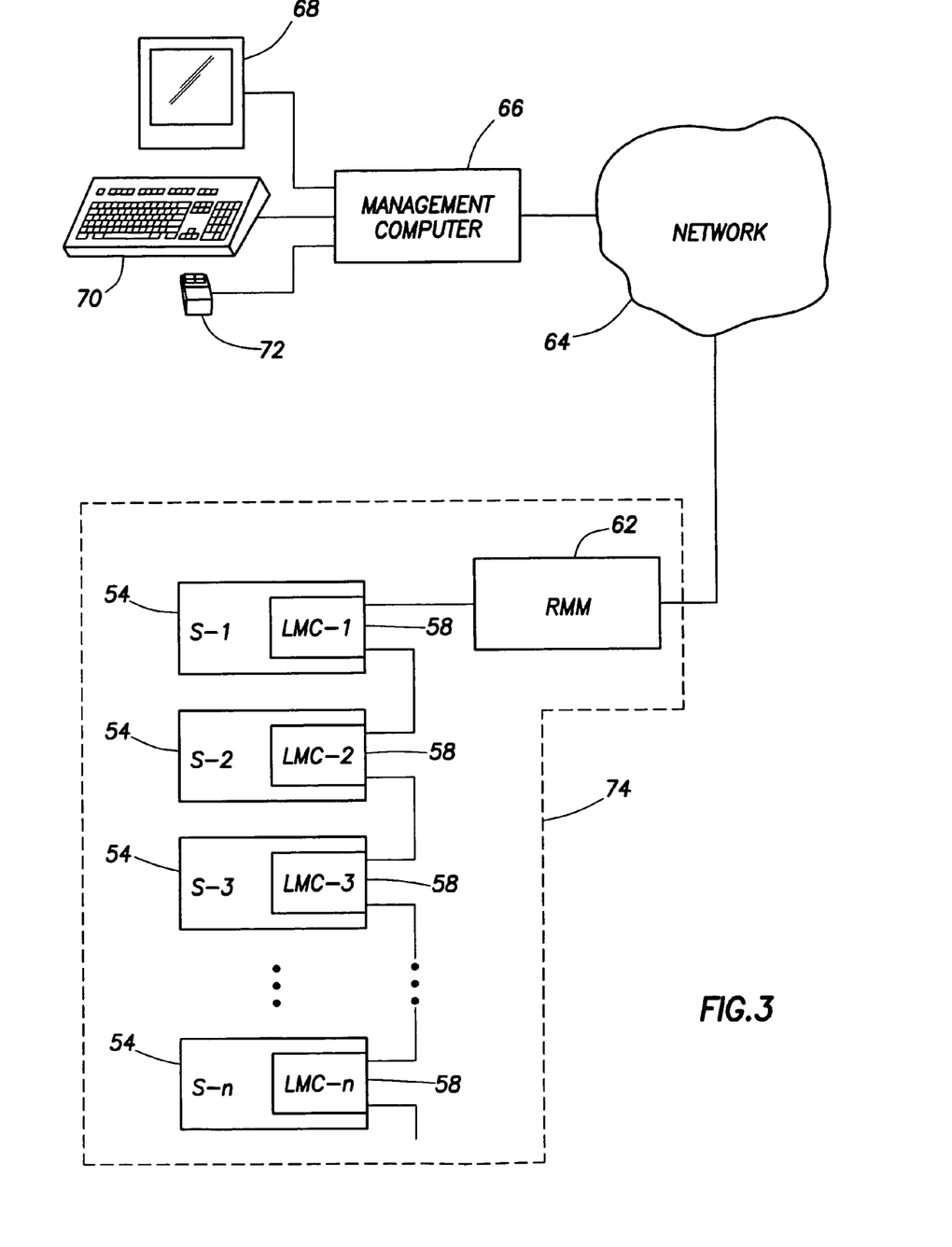
FIG. 3 is a block diagram of one embodiment of a remote management system for multiple servers according to the present invention.

With reference to FIG. 3, an embodiment of a new remote management system for multiple servers will be described. Servers 54, also labeled S-1 through S-n, represent a plurality n of servers, which may be mounted in a single rack. Servers 54 include Local Management Controllers, (LMCs), 58 also labeled LMC-1 through LMC-n. The LMCs convert each server's management signals into encoded and packetized signals carried over a cable. The LMC modules 58 also include multiplexing and addressing circuitry to allow the LMCs to be daisy chained as illustrated in FIG. 3.

One port of LMC-1 is connected to a remote management module, RMM, 62. Module 62 may contain a portion of the hardware and software of the remote management module 12 of FIG. 1. In this embodiment, only one module 62 is needed for remote management of all the servers 54. The remote management module 62 may be physically located in server S-1, may be located in a rack controller box, or may be in a separate box of its own. RMM 62 supports IP protocol signals through a network 64, e.g., the Internet, to a management computer 66 which may be the same as computer 20 of FIG. 1. Likewise, computer 66 is coupled to a monitor 68, a keyboard 70 and a mouse 72.

As with the prior art system of FIG. 1, the FIG. 3 system allows a server administrator using the computer 66 to remotely manage all of the servers 54. In this embodiment, only one server 54 can be connected through the RMM 62 at a time. This does not impose a significant issue, since most server administrators manage one server at a time anyway. This embodiment requires only one remote management module 62, instead of one for each server, uses much less network cabling for the remote management function, and needs only one IP address for RMM 62 instead of one for a separate remote management module in each server 54.

Up to 42 servers of the 1U size can be mounted in a single rack and can be daisy chained together as illustrated in FIG. 3. The servers in a single rack can of course be subdivided into smaller groups if desired, and servers in more than one rack can be connected into a single group. It is normal for one or more of the slots in a rack to be used for power supplies and rack management systems, so that less than 42 servers may be mounted in a single rack.

Figure 4:
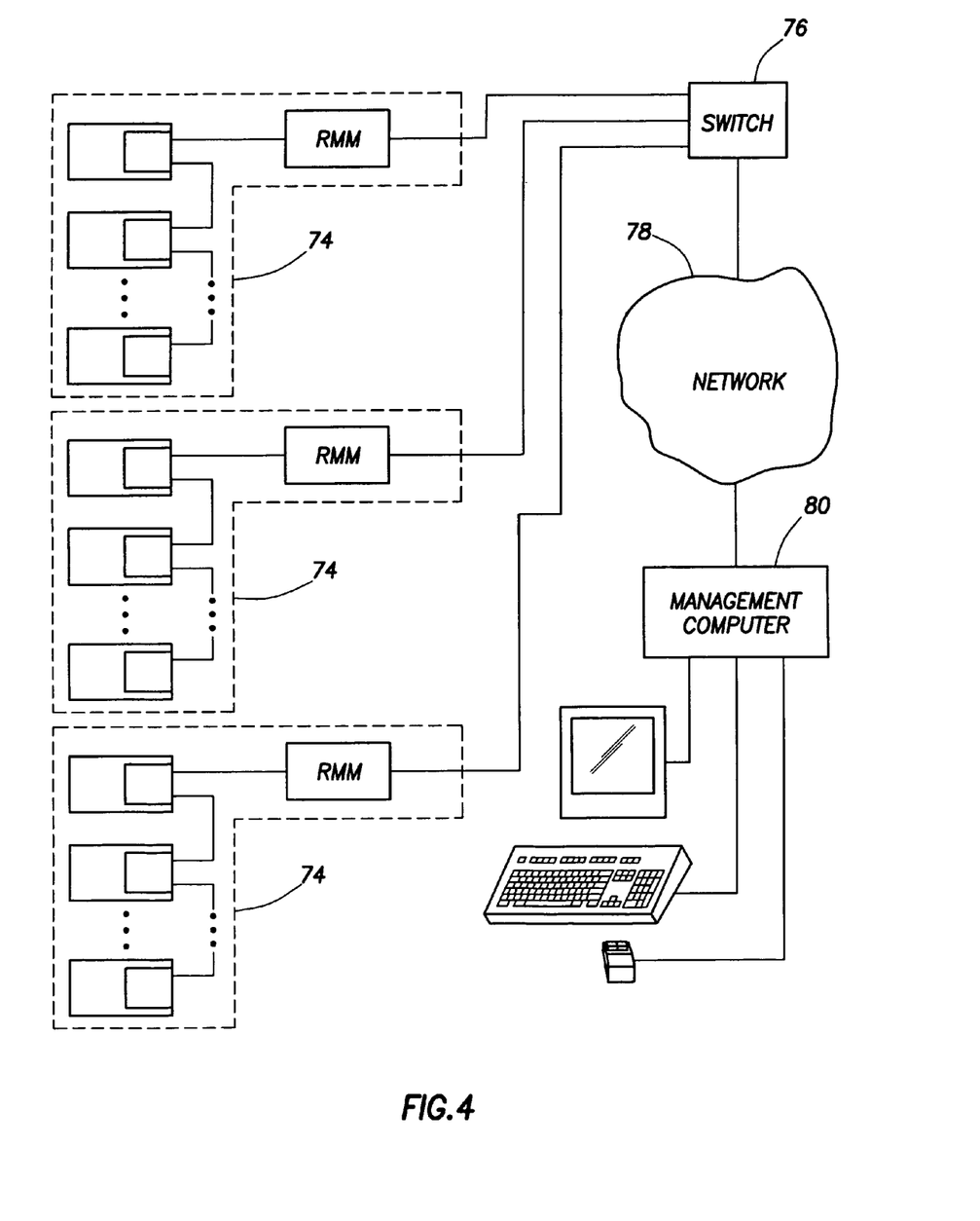
FIG. 4 is a block diagram of another embodiment of the present invention connecting multiple implementations of the FIG. 3 embodiment through a network switch.

FIG. 4 illustrates an embodiment in which servers in a single rack are broken into smaller groups. A portion of the FIG. 3 system is shown within a dashed line box 74. In FIG. 4, this portion 74 is shown replicated several times. If each portion 74 is selected to have seven servers, there can be up to six sets arranged as shown in FIG. 4 in a single rack of forty-two servers. The outputs of the remote management module in each subset of servers is coupled to one network switch 76 which couples a selected signal through a network 78 to a remote management computer 80.

Figure 5:
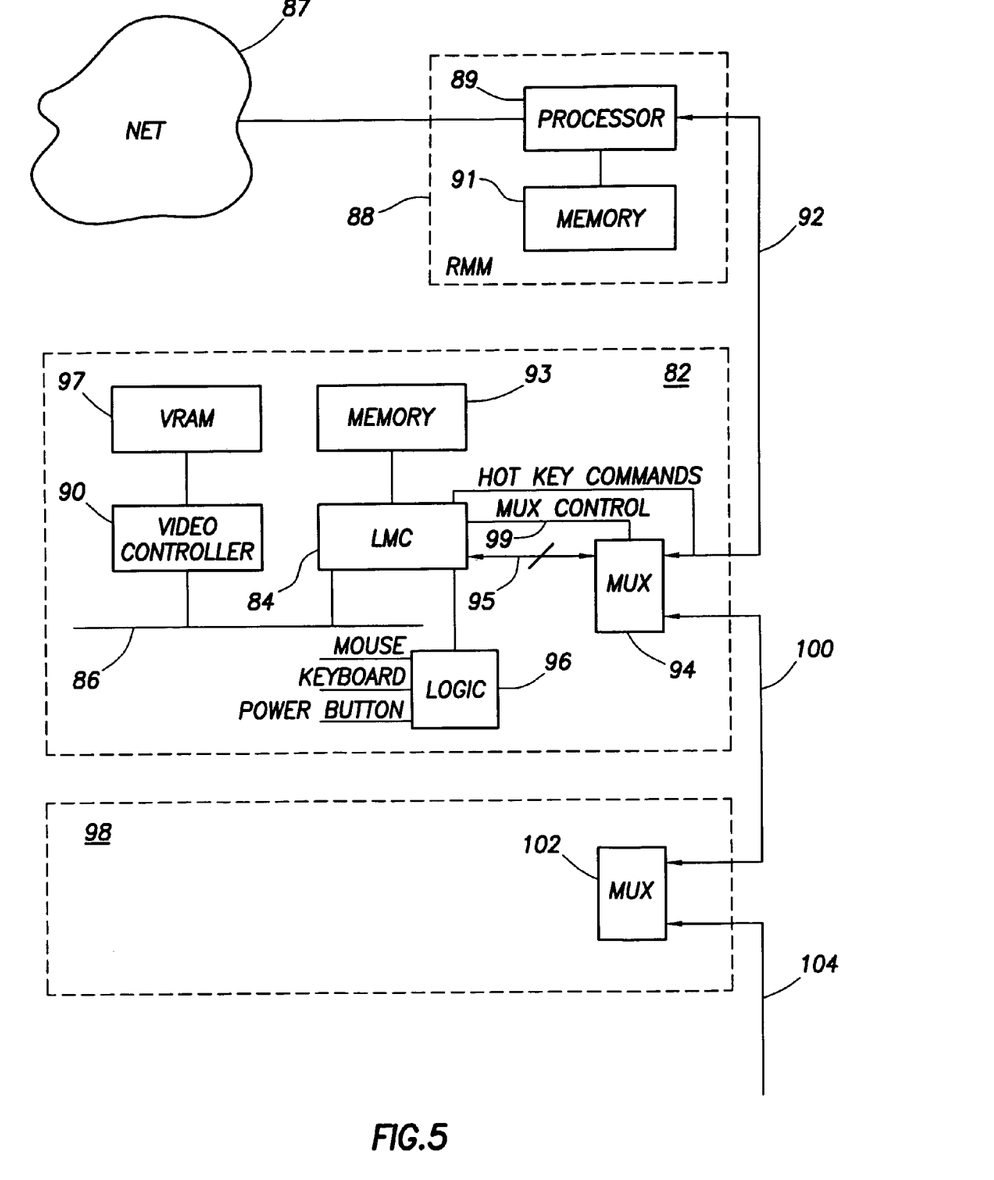
FIG. 5 is a block diagram illustrating more details of the present invention.

FIG. 5 shows a more detailed embodiment of the present invention in which the server management signals for servers are coupled by a daisy-chained bus to the remote management module. Components forming part of a first rack-mounted server are shown in dotted line box 82. For the out-going data, i.e., data going from server 82 to a remote management module 88, a local management controller, LMC, 84 snoops the video traffic on the PCI bus 86, and communicates with a video controller 90 to transfer blocks of video data from video random access memory, VRAM, 97 to LMC memory 93. The video data blocks and other status information are then converted into packets by LMC 84 and sent to a processor 89 in RMM 88 via a multiplexor 94 and bus segment 92. The processor 89 stores the video data blocks in a memory 91, calculates a hash of the block, and compares it with the hash value of the previous video block of the same frame location zone. If the hash values are different, i.e., the video block is new, then the processor 89 repackages the video block into an appropriate format to be displayed on a Java console, i.e., as part of a HTTP web page, and sends them through network 87 to a remote management computer, e.g., computer 66 shown in FIG. 3.

For incoming data, the processor 89 in the remote management module 88 converts the server management command and data signals received over the network 87 into packets and sends them to the selected LMC, e.g., 84, via bus segment 92, through multiplexor 94 and via bus segment 95. LMC 84 receives the data packets and decodes them to extract information such as signals for keyboard, mouse, power button, or data from a remote CD or floppy device, e.g., a disk image. If the incoming information is for keyboard, mouse or power button, then these information are further decoded by logic 96 and coupled to appropriate standard signals in the server 82. Alternatively, for keyboard and mouse signals, LMC 84 may contain a USB device logic, and the keyboard and mouse signals can be sent to the system software running on the server 82, via the PCI bus 86, thus eliminating the need for the logic 96 for keyboard and mouse signal translations. For data from CD/floppy device, the data is sent to the appropriate device interface software via the PCI bus 86.

RMM 88 of FIG. 5 may be the same as RMM 62 of FIG. 3. A portion of RMM 88 may be essentially the same as the modules 12 of FIG. 1. The signals from the RMM 88 are coupled to the multiplexor 94 of the first server 82, by means of a daisy chained bus segment 92. The outbound signals from LMC 84 are coupled to multiplexor 94 via the bus segment 95. The inbound signals to the LMC 84 are also coupled from multiplexor 94 via the bus segment 95. The inbound hot key commands are coupled from bus segment 92 to the LMC 84. Via the MUX control signal 99, the LMC 84 will act upon the hot key commands to control the multiplexor 94 to be in either switch or broadcast mode. In switch mode, the multiplexor 94 either couples the server 82 to the RMM 88 via segment 92, or couples the next server 98 to the RMM 88, via bus segments 92 and 100. In broadcast mode, the multiplexors 94, 102, etc. couple all servers 82, 98, etc. to the RMM 88. The broadcast mode is used for multiple purposes, such as to automatically assign ID, and to broadcast firmware updates to all the servers in the chain.

The automatic ID assignment is as follows. When no server has been selected, the MUX 94, 102, etc. in servers 82, 98, etc. may be "shorted", that they simply connect their external connections to pass signal along the daisy chain bus. For example, segments 92, 100 and 104 are connected in series. The RAM 88 then sends an initial ID assignment packet with an initial ID down the link 92, effectively broadcasting the ID. Upon receiving the initial ID assignment packet, all the LMCs will disable the downstream link, e.g., MUX 94 disabling link 100, MUX 102 disabling link 104, etc. RMM 88 then sends the "Start ID" packet, which will only be receivable by the first LMC 84. LMC 84 then keeps the initial ID number, sends an incremented ID number to the next LMC via MUX 94, link 100 and MUX 102, and enables the MUX 94 so that link 92 and link 100 are coupled. This process goes on until the last LMC finds out no other links to send, at which point the last LMC will send the "End ID" packet back to the RMM along the daisy-chained links.

Several alternate methods for numbering or ID assignment exist, including one that involves bi-directional communication with each LMC. The RMM 88 sends an initial command telling each LMC to open its MUX, disabling their downstream link. This allows RMM 88 to communicate directly and solely with the first LMC 84. The RMM 88 can obtain information from LMC 84 such as its current configuration (including current number) and firmware/hardware revision. If LMC 84 has not been previously assigned a number, RMM 88 can then assign it a new number and give it the command to close its MUX 94, allowing the RMM 88 to communicate directly with the next RMM in the chain over link 100 and repeat the operations performed on LMC 84. This process is repeated for each LMC in the chain and allows the RMM 88 the ability to obtain information about each LMC prior to assigning it a number.

A second dotted line box 98 represents a second server coupled to server 82 by a second daisy chain bus segment 100. Segment 100 is connected between multiplexor 94 and corresponding multiplexor 102 in server 98. A third daisy chain bus segment 104 is connected to multiplexor 102 and may be coupled to a third server and so on.

The FIG. 5 embodiment provides a system for coupling the server management signals from any selected server 82, 98, etc. connected through the daisy chained bus 92, 100, 104, etc. to the remote management module 88. The selection of which server is to be connected is made by the server administrator from a remote computer, e.g., computer 66 of FIG. 3. When no server has been selected, the multiplexors 94, 102, etc. in servers 82, 98, etc. may be "shorted", that they simply connect their external connections to pass signal along the daisy chain bus. For example, segments 92, 100 and 104 are connected in series. As a result, hot key commands from the server administrator are coupled to all of the servers 82, 98, etc. and in particular to the LMCs, e.g., LMC 84. Each server has a unique ID, as an address, which may be included in a hot key command. The server which recognizes its ID sends a signal to its MUX causing it to switch that server's management signal path onto the bus and thereby to the RMM 88. When a management session ends, the MUX is switched back to the shorted or pass through condition. The RMM 88 may be implemented inside a separate box, or on a PCI card and located inside the server 82, along with LMC 84 and multiplexor 94.

Figure 6:
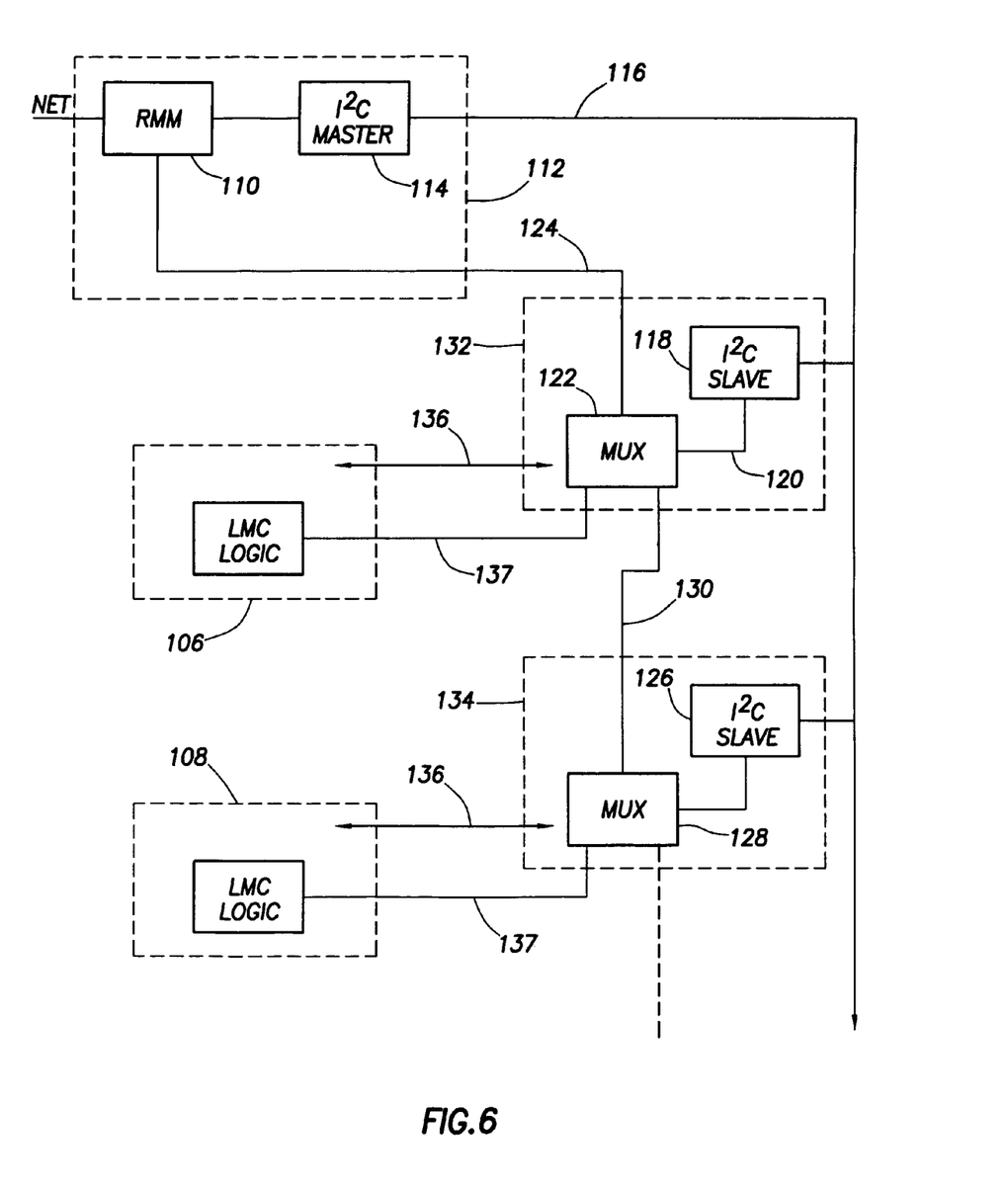
FIG. 6 is a block diagram of an embodiment of the present invention using a control bus for selection of servers for remote management.

FIG. 6 shows an alternate embodiment of the present invention using a low-overhead control bus, e.g., an I²C bus, for selection of servers for remote management. Two dashed line boxes 106 and 108 represent servers which are to be remotely managed in a manner very similar to servers 82 and 98 of FIG. 5. Additional servers may be added below server 108. As in the FIG. 5 embodiment, the system in FIG. 4 provides a means for coupling the server management signals in server 106 to a remote management module, RMM, 110. The remote management module 110 and other elements, e.g., bus master 114, may be housed in another server or may be housed in a rack controller box 112.

The RMM 110 is provided with a control bus master device 114 which provides signals on a control bus 116 for selecting a server, e.g., 106 or 108 to be connected to RMM 110. In FIG. 6, an I²C bus is shown as an exemplary control bus 116. Alternately, one or more RS-485 serial buses can be used for higher data rate signaling. A control bus slave device 118 is provided for server 106. The control bus master device 114 selects the control bus slave 118 by placing an appropriate address or chip select signal on the control bus 116. In response to the signal, the slave device 118 sends a selection signal on line 120 to MUX 122, and MUX 122 couples the signals from server 106 to the information bus segment 124 and thereby to the remote management module 110. A control bus slave device 126 and MUX 128 are provided for selectively coupling signals for server 108 to the remote management module 110 by way of daisy chained information bus segment 130, MUX 122 and bus segment 124. Another control bus slave device and MUX is provided for each additional server which is part of the group or island of servers which are to be remotely controlled through RMM 110.

The signal packets on the buses, e.g., buses 92, 100, 104 in FIG. 5, or information buses 124, 130 in FIG. 6, will have a message format consisting of header and payload portions. The header may constitute Message Type (e.g., Broadcast, Configuration, Transaction, Select, Exception, Scan), Command (e.g., Full, Partial, Read, Write, Initialize, Reset, Begin, Update) or Status (e.g., Finish, Error, Busy), Payload Type, Payload Size, Checksum for error handling, Source Address, Destination Address.

The Broadcast message with Full command is intended for all LMCs connected on the bus. The Broadcast message with Partial command is intended for only the selected LMCs whose Partial Broadcast bit is set in RMM. The Broadcast message type enables the RMM to send a command and data to one or all or any number of the connected LMCs with a single message, e.g., to initialize the LMCs, to start the identification process, or to upgrade firmware on the LMC. After each broadcast message, the intended LMCs will be polled to respond with an acknowledgement message to verify the broadcasted message reception. After a Broadcast message with the Initialize command, all LMCs will issue a signal to disable their corresponding multiplexors' downstream links, e.g., LMC in server 106 issues signal to the MUX 122, to disable the electrical connection of upstream segment 124 to the downstream segment 130. This automatically leaves only the first LMC in the chain to be electrically connected to the RMM.

The Configuration message is to be used to configure the LMCs. Upon receipt of the Configuration message with the Begin command, the first LMC, of server 106, in the chain starts the self-identification process by adopting the ID issued by the RMM 110, and propagates the modified ID (e.g., increment the value by 1), enables its MUX 122 downstream link 130, and then sends the Configuration message with the Begin command to the next LMC, in server 108. The configuration goes on until the last LMC, which responds to a Configuration message with the status Finish back to the upstream LMC. The Configuration message with the Finish status propagates all the way back to the first LMC, in server 106, which in turn sends the Configuration Finish message to the RMM 110. Alternatively, the first LMC in server 106 adopts the ID which is included in the Configuration message payload sent by RMM 110, then sets its internal Ignore Configuraton bit, and immediately responds to the Configuration message with the Finish status back to the RMM 110. RMM 110 issues another Configuration Begin message, which is ignored by the first LMC since it is already configured, but accepted by the second LMC in server 108. This process is repeated by RMM 110 to configure all LMCs, one at a time.

The Transaction message is for normal transactions intended for only one device. For FIG. 5, if a LMC sees its address in the Transaction message, then it will accept the message, otherwise it will forward the message to the downstream LMC. For FIG. 6, the Transaction message can be routed to the targeted LMC by addressing the appropriate bus slave, e.g., 118, 126. For Transaction messages with the Write command, the Payload portion of the packet will contain the data to be written.

The Select message with Register command will allow a LMC or RMM to select a register identified by the information in the Payload. A successfully executed Transaction Write command will be responded to by a Transaction Finish status packet. For Transaction messages with the Read command, the Payload will be empty. However, a successfully executed Transaction Read command will be responded to by a Transaction Finish status packet with the data read contained in the Payload. If the receiver detects received error after comparing the computed checksum of the payload to the Checksum value included in the packet, then it will send Exception message back to the sender, with the Checksum Error code in the Payload.

The Scan message will notify each server to collect data, such as video display, performance parameters, system statuses, etc., and transmit to the RMM when they are requested. The Configuration message can be used to configure each server to comprehend what information is to be collected for the scanning operation. This feature will allow the remote operator to be able to view information from multiple servers for monitoring purposes, without manually probing the information.

In the FIG. 6 embodiment, the control bus slave device 118 and MUX 122 may be housed in a separate module as indicated by dashed line box 132. One such module is provided for each server 106, 108, etc. In some implementations, the module 132 may have three connectors, one for connections to the controller box 112 (consisting the wires 124 and 116), one for connections to the server 106 (consisting the wires 136 and 137) and one for connection to the next module 134 (consisting the wires 130 and 116). The power connection 136 provides power to the control bus slaves 118, 126, etc. and the multiplexors 122, 128, etc. The modules 132, 134, etc. form factor may be small enough that they can be physically located inside the cavity of the servers 106, 108, etc., respectively, in the same manner as PC Cards are coupled to PCMCIA slots. In other implementations, several parts of the FIG. 6 drawing, except the servers 106, 108, etc., may be implemented on a PCB backplane, where a server, e.g., 106, will be plugged in to a connector that contains the power 136 and the signals 137. Furthermore, in some other implementations, the remote management module 110 and the control bus master 114 may be integrated on a PCI card, and located inside the first server 106 with a module 132 attached to it without any other servers coupled to the bus segment 130. This implementation is a demonstration of this invention applicability for a single server use. Repeating this implementation will be functionally equivalent to the prior art implementation as shown in FIG. 1.

The FIG. 6 embodiment provides a simple system for selectively providing remote management to a number of servers while using only one remote management module, one network address, and a minimum of connecting cables.

Figure 7:
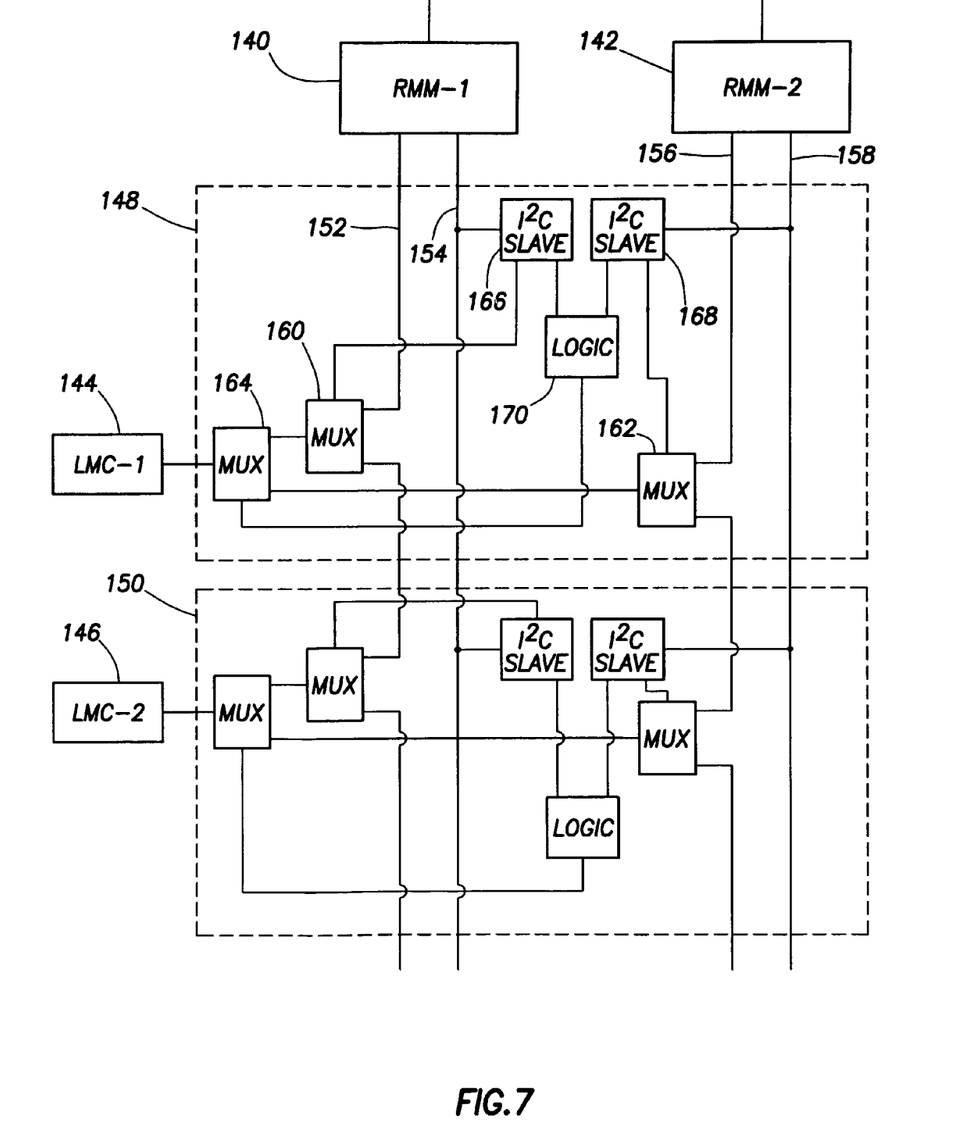
FIG. 7 is a block diagram of an alternative embodiment of the present invention providing server connections to multiple remote management modules.

FIG. 7 is a block diagram illustrating an expansion of the FIG. 6 embodiment to allow each server to be coupled to more than one remote management module. This arrangement allows multiple administrators to manage multiple different servers in the same group at the same time. Two RMMs 140 and 142 are provided for remotely managing a group of servers including the two servers represented by their local management controllers 144 and 146. Multiplexing units 148 and 150 allow each LMC 144, 146 to connect to either of the RMMs 140, 142. Each RMM 140, 142 includes the elements shown in box 112 of FIG. 6. RMM 140 has a signal bus 152 and a control bus 154. Likewise, RMM 142 has a signal bus 156 and a control bus 158. Multiplexing unit 148 includes multiplexor 160 connected to signal bus 152 and multiplexor 162 connected to signal bus 156. A third multiplexor 164 connects the signal lines from LMC 144 to either multiplexor 160 or multiplexor 162 through which LMC 144 may be coupled to RMM 140 or 142 respectively.

The selection of which RMM 140 or 142 will be connected to LMC 144 is made by the signals on control busses 154 and 158. Bus slave devices 166 and 168 are coupled to the control busses 154 and 158 respectively. If slave 166 receives a signal identifying LMC 144, it sends a signal to multiplexor 160 and to a logic device 170. The logic device 170 sends a signal to multiplexor 164 causing it to connect LMC 144 to multiplexor 160. The signal from slave 166 to multiplexor 160 causes the multiplexor 160 to connect the signals from LMC 144 to RMM 140.

In similar fashion, if slave 168 receives a signal identifying LMC 144, it sends a signal to multiplexor 162 and to a logic device 170. Logic 170 then causes multiplexor 164 to connect LMC 144 to multiplexor 162. LMC 144 is thereby connected to RMM 142. Note that logic 170 and multiplexor 164 prevent the connection of LMC 144 to both RMM 140 and RMM 142 at the same time.

The multiplexor logic 150 is identical to logic unit 148. It allows LMC 146 to be connected to either of RMM 140 or RMM 142. A multiplexor logic unit like 148 and 150 is provided for each server in the group. In an example discussed above, a rack of 42 servers may be divided into six groups of seven servers, with each group having one RMM. In that arrangement, it is not possible to simultaneously manage two servers in the same group. In the FIG. 7 arrangement, a group may contain 14 servers and two administrators can manage any two of the 14 simultaneously. The ratio of RMMs to servers would remain the same, but the administrators have more flexibility as to which servers they can manage.

If desired, the group size can be increased further and multiplexing logic can be provided to allow a larger number of RMMs to have access to any server in a group. For example, the group size may be selected to be about twenty-one servers and three RMMs may be provided for the group. This maintains the ratio of one RMM for seven servers. The multiplexing logic of course becomes more complex. If desired, the multiplexing logic and the signal and control busses may be implemented on a back plane to which servers are attached.

Figure 8:
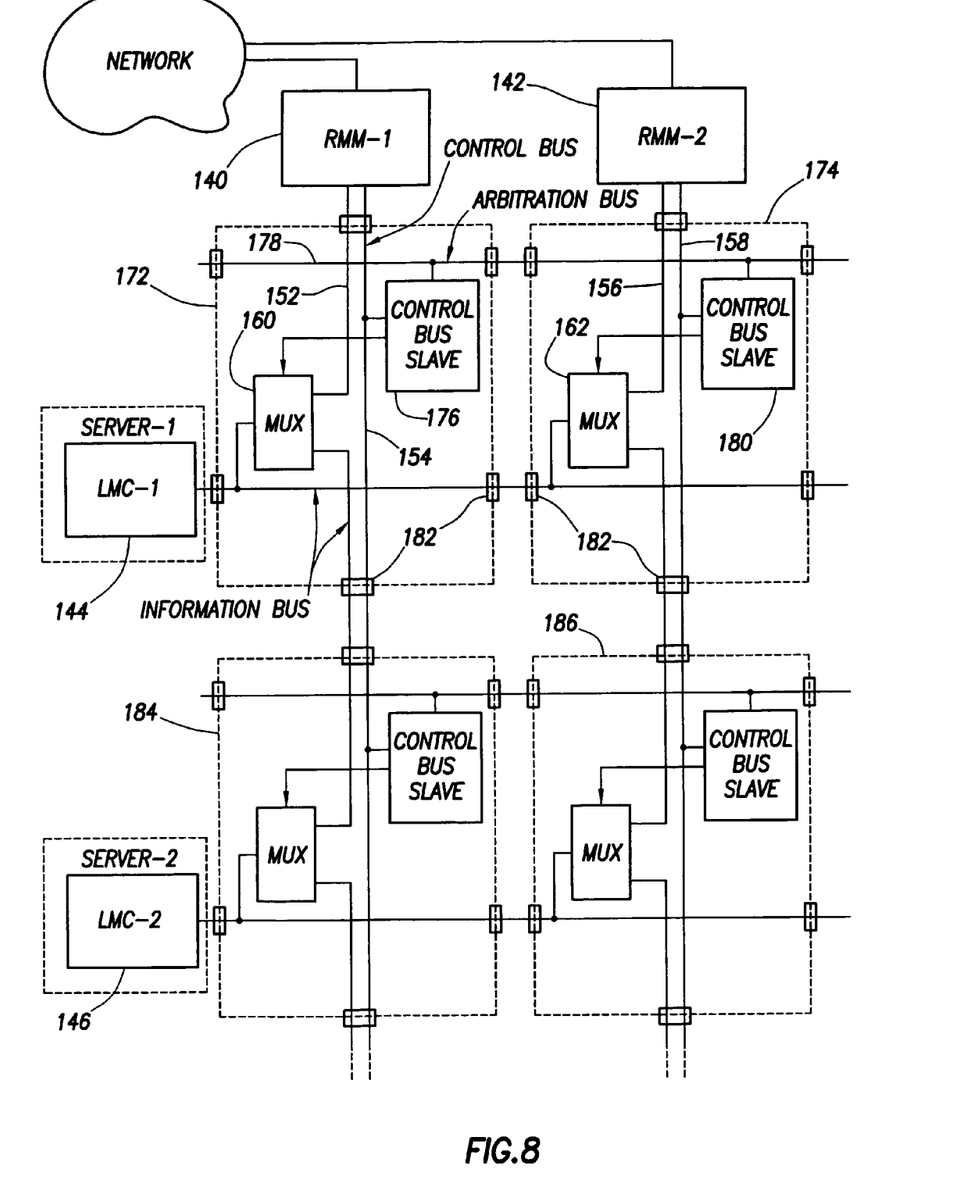
FIG. 8 is a block diagram of an alternate arrangement of the FIG. 7 embodiment.

FIG. 8 provides a block diagram of alternative multiplexor logic for coupling multiple remote management modules to a group of servers. In this embodiment the multiplexor units are identical, providing simple scalability of both servers and remote management units. Parts which may be identical to parts shown in FIG. 7 have the same reference numbers, including: LMCs 144 and 146, RMMs 140 and 142; signal busses 152 and 156, control busses 154 and 158, and multiplexors 160 and 162.

In FIG. 8 two identical multiplexor logic units 172 and 174 are provided to couple LMC 144 to RMM 140 or RMC 142 respectively. Unit 172 includes a control bus slave 176 which may be almost identical to slave 166 of FIG. 7. Slave 176 differs in having a connection to an arbitration bus 178. Unit 174 includes a control bus slave 180 also having a connection to bus 178. The arbitration bus 178 allows the slave devices 176 and 180, and any other slave devices which may be provided to allow LMC 144 to be connected to other RMMs, to prevent more than one RMM at a time from calling for a connection to LMC 144. RMM-1 140 and RMM-2 142 may also communicate with each other via their corresponding control bus segments 154, 158, and the arbitration bus 178. With this arrangement, the logic unit 170 and multiplexor 164 of FIG. 7 are not needed. Each wire passing to and from the dotted line boxes 172, 174 are shown passing through a connector block 182. The connector blocks 182 demonstrate scalability because the blocks may be identical and simply plugged together. Logic units 184 and 186, identical to units 172 and 174, are provided to allow LMC 146 to be connected to RMM 140 or RMM 142 respectively.

The FIG. 8 embodiment has the advantages of the FIG. 7 embodiment. For example, two server administrators may access any two servers in the group at the same time. By use of the arbitration bus 178, the multiplexing logic is simplified and is more easily expanded to include more RMMs and more servers. Arbitration may be accomplished in the control bus slaves 176, 180, etc. or may be accomplished in the RMMs. As shown in FIG. 6, the RMMs each include an associated control bus master device. The master devices in each RMM can communicate with each other through their connections to their respective control busses and bus slave devices. Since it is the bus master devices which receive requests to connect servers to RMMs and respond by placing appropriate device IDs on control busses, the bus masters are an appropriate location for performing arbitration to prevent simultaneous connection of two one server to two different RMMs at the same time.

Conceptually, the logic in RMM 12 in server 10 of FIG. 1 is split between logics of LMC 84 in server 82 and RMM 88 of FIG. 5, with additional multiplexors, and buses to physically connecting the split logics and a set of messaging protocols to transport the data between the split logics. FIG. 5 illustrates a scenario where the video controller 90 and the VRAM 97 are close to the LMC 84 and reside in the same enclosure, server 82. Alternatively, the video subsystem can be virtualized, i.e., the video controller 90 and the VRAM 97 can be in RMM 88, while LMC 84 remains in the server 82 to intercept the video commands on the PCI bus 86 and forward them to the video controller 90 in RMM 88. LMC 84 will then have to act as a virtual video controller, so that the system software will send the video commands even though the physical video controller 90 is not present in the server 82. The messaging protocol will remain the same. Virtualization of the video controller is beyond the scope of this invention. It is described here to illustrate that the invention supports variations of the logic contents in a Local Management Controller and a Remote Management Module.

Figure 9:
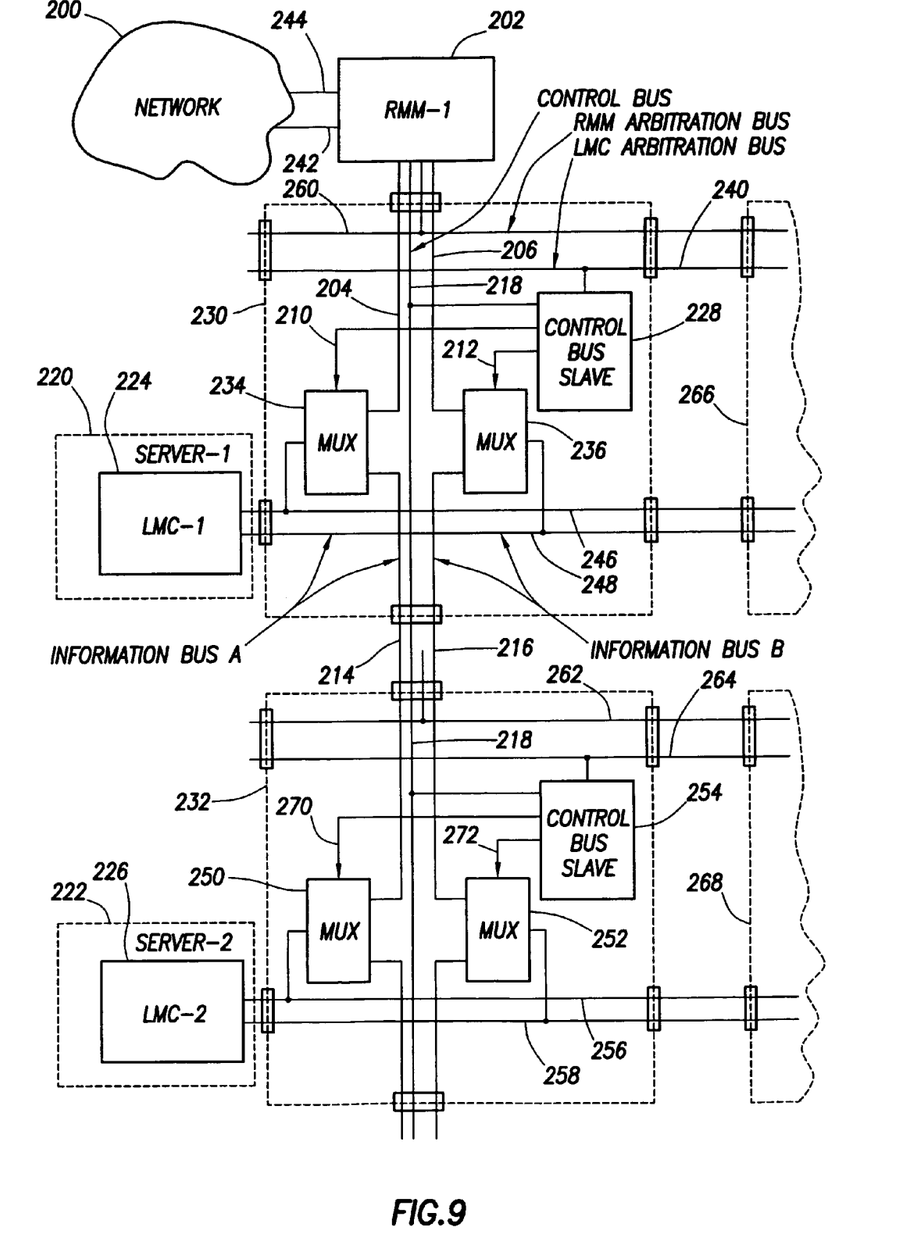
FIG. 9 is a block diagram of an alternate embodiment in which two data busses are used to couple remote management modules to servers.

FIG. 9 provides a block diagram of another embodiment for coupling one or more remote management modules to a group of servers. In this embodiment, a pair of multiplexor units 230 and 232 are provided for coupling servers 220 and 222 to a remote management module 202. The multiplexor units 230 and 232 are identical, providing simple scalability of both servers and remote management units. Many of the elements shown in FIG. 9 may be identical to elements shown in embodiments described above. Local management controllers 224 and 226 differ from the LMCs described in previous figures in each having two information busses 246, 248 and 256, 258 respectively. The remote management module 202 differs from the RMMs shown in previous figures in having two information busses 204, 206 and RMM arbitration bus 260, in addition to a control bus 218 and in having two network connections 242, 244. The multiple information busses provide more flexibility in connections between RMM 202 and LMCs 224 and 226. For example, RMM 202 may be coupled to LMC 224 for inbound signals, while sending outbound signals to LMC 226. Also, LMC 224 may be coupled to RMM 202 for inbound signals on the Information Bus B 248, 206 via the multiplexor unit 230, while sending outbound signals to another RMM (not shown in FIG. 9) on the Information Bus A 246 via multiplexor unit 266. The network connections 242, 244 can be independent networks with different IP addresses, teamed networks for redundancy purposes, or port-aggregation networks for higher bandwidth.

In FIG. 9, the multiplexor unit 230 is provided to couple LMC 224 to RMM 202. RMM 202 will issue a control signal over the Control Bus 218 to the Control Bus Slave 228, to control the identical multiplexors 234 and 236 by issuing the control signals 210 and 212, respectively. The Information Bus A 246 and the Information Bus B 248 provide two paths for LMC 224 to couple to RMM 202, e.g., transmit on one bus and receive on another bus. Depending on the control signal on 210, the multiplexor 234 will couple the bus segment 204 to 214, or 204 to 246. Similarly, depending on the control signal on 212, the multiplexor 236 will couple the bus segment 206 to 216, or 206 to 248. The multiplexor logics 230 and 232 are identical. The multiplexor units 250 and 252 are to couple the information busses 256 and 258 of LMC 226 to RMM 202. RMM 202 can issue control signals over 218 to the Control Bus Slaves 228 and 254, which in turn issue control signals to the multiplexors 234, 236 in the multiplexor logic 230, and the multiplexors 250, 252 in the multiplexor logic 232, respectively, in a way that LMC 224 is coupled to RMM 202 on Information Bus A via bus segments 246 and 204, while LMC 226 is coupled to RMM 202 on Information Bus B via bus segments 258, 216 and 206. In other words, LMC 224 can be transmitting to RMM 202, while LMC 226 can be receiving from RMM 202, at the same time. The transmit and receive functions between RMM 202 and LMCs 224, 226 are implementation dependent, i.e., the Information Busses A and B can be implemented to be transmit or receive only, half-duplex transmit/receive, or full duplex.

The multiplexor logic units 266 and 268 are replications of 230 and 232, to support additional RMMs, similar to the FIG. 8 embodiment. With multiple information busses to couple between LMCs and RMMs, and with the flexibility to have a combination of inbound and outbound signals to different LMC-RMM pairs, it will not be sufficient for the Control Bus Slaves, e.g., 228, 254, to arbitrate over the LMC Arbitration Bus 240, 264. The RMMs have to participate in the arbitration process, which may be achieved via the Control Bus 218, the Control Bus Slaves 228, 254, and the LMC Arbitration Busses 240, 264. However, the RMMs will be able to communicate more effectively via the dedicated RMM Arbitration Busses 260 and 262, that are coupled to the RMMs only at the top-level multiplexor logics 230, 266. There will be no connections to the RMM Arbitration Busses, e.g., 262, in the lower-level multiplexor logics, e.g., 232, 268. The RMMs will still issue control signals to the Control Busses, e.g., 218, to manage the Control Bus Slaves, e.g., 228, 254, to issue signals, e.g., 210, 212, 270, 272, to control the MUXs 234, 236, 250, 252.

Each of the embodiments disclosed herein is suitable for use of daisy-chained busses to connect RMMs to a group of servers. As illustrated in the figures, this can reduce the length of cabling required. However the present invention is equally applicable to an arrangement in which the various components are electrically daisy chained, but in which each server is directly wired to a single box containing one or more RMMs. This arrangement can be understood by reference to FIG. 9. The RMM 202 and a multiplexor logic unit for each server in a group, e.g., units 230 and 232, may be physically implemented in one box mounted in a rack with a group of servers. A separate cable would then be run from each server to a connector on the box with the RMM and multiplexors.

Throughout this disclosure, the remote management system has been described with reference to management of computer servers. The embodiment shown herein are equally applicable to management of other systems such as data storage systems, data networking equipment, cable head-end equipment, satellite equipment, radio/cellular station equipment, etc. so long as they have a means for being remotely accessed. Most such systems are controlled by a computer device equivalent to a computer server for the purposes of the present invention and can be remotely managed.

In this disclosure, the remote management modules are connected to a management computer through a network.

Any known protocol for network communication may be used within the scope of this invention. For example HTTP at the application layer and IP at the network layer are common protocols.

If desired, security privileges may be incorporated into the remote management modules. For example, a particular administrator may be allowed to access only some of the servers in a group assigned to a particular RMM.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A remote management system for a plurality of servers comprising:
    a remote management module located near a group of servers, the remote management module having a first port for exchanging server management command and data signals with a server and a second port for exchanging signals with a remote server management computer, and
    a bus coupled to said first port of said remote management unit and to each of said servers,
    wherein said bus comprises a plurality of segments coupling said first port to each of said servers;
    further comprising;
    a multiplexor for each of said servers, each multiplexor having first, second and third multiplexor ports, the first and second multiplexor ports coupled to said bus segments and the third multiplexor port coupled to its associated server, the multiplexor having a switch mode in which the first multiplexor port is selectively coupled to either the second multiplexor port or the third multiplexor port and having a broadcast mode in which the first multiplexor port is coupled to both the second multiplexor port and the third multiplexor port.

2. A remote management system according to claim 1 further comprising:
    for each server, a local management controller coupling its associated server to said bus and converting server management status and video data signals from its associated server to packetized signals coupled to said bus.

3. A remote management system according to claim 2 wherein:
    said local management controller converts packetized signals from said bus to server command and data signals for its associated server.

4. A remote management system according to claim 1 wherein:
    said bus comprises a plurality of bus segments coupled in daisy chain fashion.

5. A remote management system according to claim 1 wherein:
    said bus comprises a multiconductor cable carrying packetized signals.

6. A remote management system according to claim 1 wherein:
    each multiplexor is adapted to respond to a hot key signal on said bus identifying its associated server and couple said server to said bus.

7. A remote management system according to claim 1 further comprising:
    a control bus master coupled to said remote management module receiving a signal identifying a server to which the remote management module is to be connected,
    a control bus slave for each of said servers and coupled to one of said multiplexors, and
    a control bus coupling said control bus master to each of said control bus slaves,
    each said control bus slave responding to a signal on said control bus identifying the server associated with the multiplexor to which it is coupled by signaling said multiplexor to couple signals from the server to the bus.

8. A remote management system according to claim 1 wherein:
    said second port exchanges signals in IP protocol.

9. A remote management system according to claim 1 wherein:
    said second port is coupled to a network.

10. A remote management system according to claim 9 wherein:
    said network is the Internet.

11. A method of remotely managing a plurality of servers comprising:
    coupling a remote management computer to a remote management module through a network,
    coupling said remote management module to a plurality of servers with a bus comprising a plurality of bus segments,
    coupling successive bus segments to first and second ports of a plurality of multiplexors,
    coupling a server to a third port of each multiplexor,
    coupling a selected server to the remote management module by connecting together the first and third ports of a multiplexor associated with the selected server and connecting together the first and second ports of at least one other multiplexor, and
    coupling all of the servers to the remote management module by connecting together the first, second, and third ports of all the multiplexors.

12. A method of remotely managing a plurality of servers according to claim 11 further comprising:
    converting server management status and video data signals from each server to packetized signals and coupling said packetized signals to said bus.

13. A method of remotely managing a plurality of servers according to claim 11 further comprising:
    converting packetized signals from said bus to server command and data signals and coupling said server command and data signals to a server.

14. A method of remotely managing a plurality of servers according to claim 11 further comprising:
    selecting a server to exchange server management command and data signals with said remote management module by sending a selection signal to a multiplexor associated with the selected server.

15. A method of remotely managing a plurality of servers according to claim 14 wherein:
    said step of selecting comprises sending a hot key command identifying the selected from said remote management computer to all servers coupled to the bus.

16. A method of remotely managing a plurality of servers according to claim 14 wherein:
    said step of selecting comprises;
    sending a server selection signal from said remote management module to a control bus master device,
    coupling the selection signal from the control bus master over a control bus to control bus slave devices associated with each server, and
    coupling a multiplexor control signal from the control bus slave device associated with the selected server to the multiplexor associated with the selected server.

* * * * *

UNITED STATES PATENT AND TRADEMARK OFFICE
CERTIFICATE OF CORRECTION

PATENT NO. : 7,003,563 B2 Page 1 of 1
APPLICATION NO. : 10/003649
DATED : February 21, 2006
INVENTOR(S) : Kevin B. Leigh et al.

It is certified that error appears in the above-identified patent and that said Letters Patent is hereby corrected as shown below:

In column 6, line 40, delete "RAM" and insert -- RMM --, therefor.

Signed and Sealed this

Twenty-first Day of April, 2009

JOHN DOLL
*Acting Director of the United States Patent and Trademark Office*